(12) United States Patent
Haruki

(10) Patent No.: US 6,771,313 B1
(45) Date of Patent: Aug. 3, 2004

(54) ELECTRONIC IMAGE RECORDING APPARATUS AND DATA MEMORIZING METHOD THEREFOR

(75) Inventor: Toshinobu Haruki, Kyotanabe (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/031,242

(22) Filed: Feb. 26, 1998

(30) Foreign Application Priority Data

Feb. 27, 1997 (JP) .............................................. 9-043428

(51) Int. Cl.[7] .............................................. H04N 5/76
(52) U.S. Cl. .................................................. 348/231.1
(58) Field of Search ................................. 348/231, 232, 348/233, 231.99, 231.1, 231.2; 711/1, 5, 153, 170, 171, 172, 173; 386/46, 117, 131

(56) References Cited

U.S. PATENT DOCUMENTS

| | | | | |
|---|---|---|---|---|
| 5,226,145 A | | 7/1993 | Moronaga et al. | 395/425 |
| 5,231,514 A | | 7/1993 | Nakamura | 358/444 |
| 5,307,171 A | * | 4/1994 | Azuma et al. | 386/131 |
| 5,581,311 A | | 12/1996 | Kuroiwa | 348/231 |
| 5,689,303 A | * | 11/1997 | Kuroiwa | 348/232 |
| 5,986,699 A | * | 11/1999 | Nishihara | 348/231 |

FOREIGN PATENT DOCUMENTS

| | | |
|---|---|---|
| JP | 02-193236 | 7/1990 |
| JP | 03-036641 | 2/1991 |
| JP | 05-143406 | 6/1993 |

OTHER PUBLICATIONS

Computer Dictionary, The Comprehensive Standard for Business, School, Library and Home, 1994, Microsoft Press, 2nd edition, p. 164.*

* cited by examiner

Primary Examiner—Wendy R. Garber
Assistant Examiner—Rashawn N Tillery
(74) Attorney, Agent, or Firm—Michaelson & Associates; Peter L. Michaelson; Janet M. Skafar

(57) ABSTRACT

A digital camera includes a flash memory. When partial image data constituting one image is written on a memory area in the flash memory, head address data of the memory area is written to the memory area written with the foregoing partial image data to the partial image data. That is, link information about the memory areas written with partial image data for a same image is written to each memory area. Therefore, if a plurality of memory areas written by partial image data are distant from one another, the image data can be reproduced or erased by tracing the head address data.

11 Claims, 9 Drawing Sheets

ELECTRONIC IMAGE RECORDING APPARATUS AND DATA MEMORIZING METHOD THEREFOR

BACKGROUND OF THE INVENTION

1. Field of the Invention

This invention relates to an electronic image recording apparatus and data memorizing method therefor. More particularly, this invention relates to an electronic image recording apparatus, such as a digital still camera, and a data memorizing method, adapted to write image data different in size into small areas, in number appropriate for a data size, formed in a flash memory, and erase desired image data from the flash memory.

2. Description of the Prior Art

In the conventional digital still camera of this kind, image data photographed and compressed are recorded in a flash memory in the order from a first As address thereof, as shown in image data area in FIG. 8. Here, the compressed image data has a size dependent upon its subject so that the image data ⓪–⑤ written in the flash memory are different in size therebetween. If the image data ①, ② and ④ are then erased, the flash memory will have vacant areas as shown in FIG. 8(B). In this state, if a double exposure is made, image data ⑥ and ⑦ are respectively stored at unoccupied areas as shown in image data area B in FIG. 8.

However, the image data size is dependent upon a subject thereof, as stated above. Accordingly, if new image data is written on a vacant area given by erasing the recorded image data, small vacant areas will be left there. That is, exposure and erasure are repeatedly made, strip-formed vacant areas are sporadically left, giving rise to a problem of lowering service efficiency of the flash memory.

In order to solve such a problem, another conventional digital still camera is structured by an FAT (File Allocation Table) and an image data area divided into a plurality of small areas, so that the allocating information to the small areas is stored into the FAT. With this structure, when the image data ⑥ and ⑦ are written in a state of image data area B in FIG. 8, the image data ⑦ is recorded into small areas that are distant from one another, thereby preventing against the formation of vacant areas within the image data area.

However, the digital still camera with this structure requires renewal to the FAT each time exposure or erasure is made, raising a problem of reducing the life of the flash memory. That is, the erasure from a flash memory is possible only by a unit called page having several kilo bytes to several tens of kilo bytes. Also, there is a limitation to a frequency capable of rewriting to a flash memory. If erasure and writing are repeated on a same address, the memory characteristics suffer from deterioration and ultimately becomes impossible to be written.

SUMMARY OF THE INVENTION

Therefore, it is a primary object of this invention to provide a novel electronic image recording apparatus.

It is another object of this invention to provide an electronic image recording apparatus which is capable of enhancing service efficiency for a flash memory and extending the life of the flash memory.

An electronic image recording apparatus according to this invention, comprising: an image inputting means for inputting image data for one image, the image data being configured by a plurality of partial image data; a nonvolatile RAM for recording the image data, the RAM including a plurality of memory areas each having a same memory capacity, the memory areas each including an image data storing section for storing partial image data and a link information storing section for storing link information; an image data writing means for writing the plurality of partial image data separately onto the respective image data storing sections of the plurality of memory areas; and a link information writing means for writing the link information linking between the plurality of memory areas.

Specifically, the link information includes address information representative of a related memory area, and further the address information includes a head address of the related memory area.

According to this invention, partial image data for constituting one image are separately stored in the memory areas of the nonvolatile RAM while link information for linking between the plurality of memory areas is written to the memory areas. Accordingly, the nonvolatile RAM is improved in utilizing efficiency, and does not require especial areas formed for storing the link information. Therefore, even where using a flash memory as the nonvolatile RAM, the life of the flash memory can be extended because a certain particular area is not frequently rewritten.

In one aspect of this invention, an electronic image recording apparatus includes a nonvolatile RAM, the nonvolatile RAM including a plurality of memory areas written with partial image data, and the plurality of the memory areas storing link information for linking between the partial image data.

A digital camera according to this invention, includes a flash memory, the flash memory includes a plurality of memory areas written with sporadic partial image data, and the plurality of memory areas memorizing address information for linking between the partial image data.

This invention is a data memorizing method for an electronic image recording apparatus adapted to store image data into a nonvolatile RAM, comprising the steps of: (a) writing first partial image data of first image into a first memory area; (b) searching a vacant memory area when the first memory area is filled up; (c) writing second partial image data of the first image into the vacant memory area as a second memory area; (d) writing a head address of the first memory area to the second memory area; and (e) writing a head address of the second memory area to the first memory area.

This method includes a step of (f) writing a succeeding image number to a succeeding memory area when the writing of all the partial image data for the first image is completed. Therefore, at the step (a), the first partial image data is written into the vacant area, as the first memory area, stored only with an image number.

In a digital camera according to one aspect of this invention, image data different in size are written into small areas, in number appropriate for a data size, formed in a nonvolatile RAM, and desired image data is erased from the nonvolatile RAM. The digital camera is characterized in that image data includes a plurality of partial image data of a same size as the small area, and a first address data writing means being provided to write head address data of a current small area to be written by current partial image data into correlated small area that is correlated to the current small area.

If the partial image data constituting the image data is written into the small area formed, for example, in a flash memory, the head address data of the small area is written into the small area written by the precedent partial image data to the partial image data. That is, linkage is formed between the small areas written by the image data. Therefore, even if the plurality of the small areas written by the image data are distant from one another, the image data can be reproduced or erased by tracing the head address data.

In this aspect, since the head address data of the current small area is written into the correlated small area that is correlated to the current small area, image data can be written by division into small areas existing distant from one another, enhancing the service efficiency of the RAM. Also, the writing of head address data eliminates the necessity of the conventional FAT, extending the life of the RAM.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing text data and image data recorded on a flash memory;

DETAILED DESCRIPTION OF THE PREFERRED EMBODIMENTS

Figure 1:
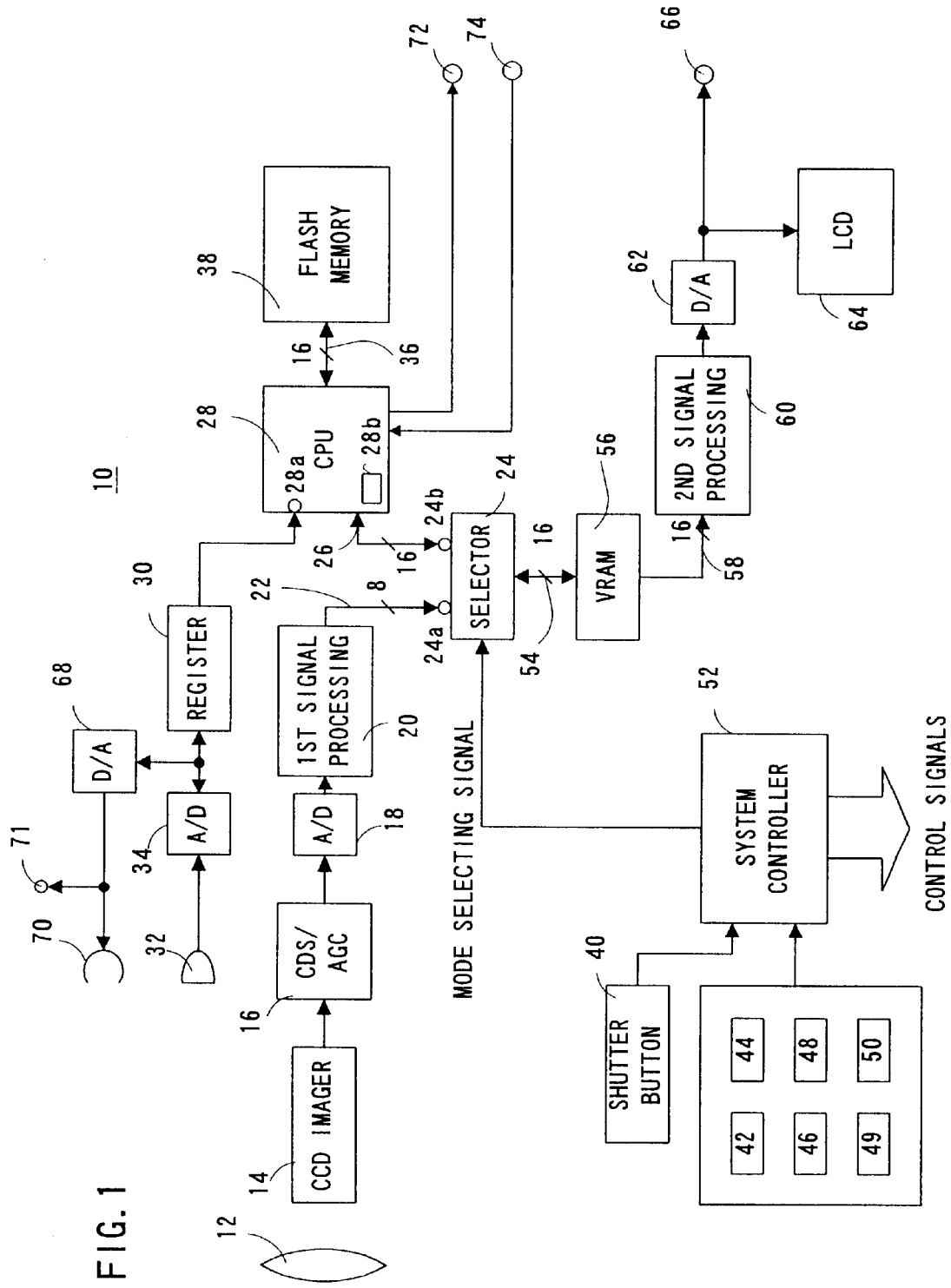
FIG. 1 is a block diagram showing one embodiment of this invention.

Referring to FIG. 1, a digital still camera 10 of this embodiment includes a lens 12. Through this lens 12 is given an optical image which is converted into an electric signal by a CCD imager 14. The CCD imager 14 has a color filter for example, in a primary color Bayer arrangement so as to output an electric signal (progressive scan signal) for each pixel according to progressing scan (pixel sequential scan).

The progressive scan signal from the CCD imager 14 is supplied to a CDS/AGC circuit 16. The CDS/AGC circuit 16 subjects known noise removal and level adjustment to the progressive scan signal from the CCD imager 14. The progressive scan signal processed by this CDS/AGC circuit 16 is converted into digital data by an A/D converter 18. The digital data of the progressive scan signal outputted from the A/D converter 18 is supplied to a first signal processing circuit 20. The first signal processing circuit 20 subjects known white-balance adjustment and gamma correction to the digital data (image data) outputted from the A/D converter 18 to supply the image data through an 8-bit bus 22 to a first input 24a of a selector 24. The selector 24 selects the first input 24a or the second input 24b depending upon a mode being set (camera mode or reproducing mode).

The second input 24b of the selector 24 is connected to a CPU 28 through a 16-bit bi-directional bus 26. The CPU 28 is for example a 16-bit CPU. The CPU 28 has an interrupt terminal 28a, to which interrupt terminal 28a is supplied a sound interruption from for example a 5-byte sound register 30.

The sound for a sound memo is supplied from a microphone 32 to an A/D converter 34 so that the sound data from the A/D converter 34 is supplied to a sound register 30. Each time the sound register 30 is loaded for example with 5 bytes of sound data, a sound interruption is inputted from the sound register 30 to the interrupt terminal 28a of the CPU 28.

Figure 2:
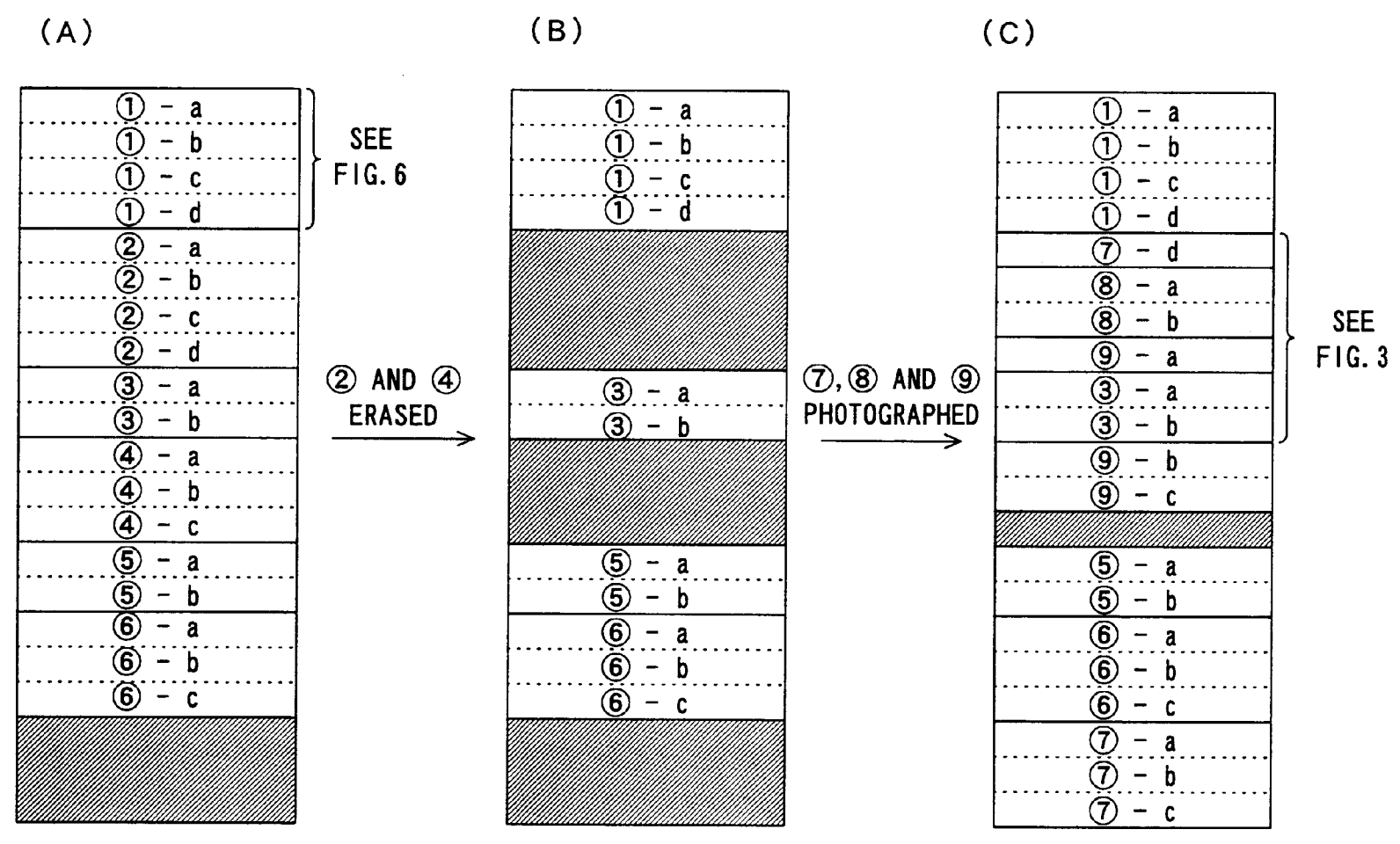

The CPU 28 is further connected to a flash memory 38 through a 16-bit bus 36. This flash memory 38 is a recording medium which has a capacity for example of 2 M bytes to record compressed images and sounds according to an operating program of the CPU 28 and a compression method for example of JPEG. The flash memory 38 has an image data area 38A as shown in FIG. 2. The image data area 38A is divided into a plurality of small areas. The compressed image data has a size dependent upon a subject thereof so that the number of the small areas required for recording the image data is determined by the size thereof. The small areas are respectively written by partial image data constituting image data.

The digital still camera 10 further includes a shutter button 40, a reproduce/camera mode selecting button 42, a resolution change-over button 44, a monitor on/off button 46, a sound memo button 48, an erase button 50 and so on. The operating signal from the operating buttons 40–50 is supplied to a system controller 52. The system controller 52 outputs a predetermined control signal depending upon an operating signal by the buttons 40–50. The control signal is converted into a serial signal by a P/S converter (not shown) to be supplied to the interrupt terminal 28a of the above-stated CPU 28.

For example, when the shutter button 40 is depressed, the system controller 52 outputs a shutter signal so that the shutter signal is supplied to the interrupt terminal 28a of the CPU 28. In response thereto, the CPU 28 suspends the CCD imager 14 from being inputted (renewed) so that a still picture signal upon the depression of the shutter button 40 is outputted from the CCD imager 14. Meanwhile, if the reproduce/camera mode selecting button 42 is operated, the system controller 52 outputs a control signal representative of either of a reproducing mode or a camera mode. The control signal is supplied to the CPU 28 and also to the selector 24. Accordingly, if the camera mode is set for example, the selector 24 selects the first input 24a, while if the reproducing mode is selected, it selects the second input 24b.

The selector 24 is connected to a VRAM 56 through a 16-bit bus 54. This VRAM 56 is structured for example by a dual-port RAM so that the VRAM can be written through an input bus 54 and simultaneously read out through an output bus 58. This VRAM 56 is used principally for display images on an LCD 64 (to be stated later), and is inherently satisfactory if it has a capacity of approximately 360 K bytes. This embodiment, however, utilizes VRAM 56 having a capacity of 512 K bytes. Therefore, the region, except for a region used for image representation, is utilized as a working memory for the CPU 28 or temporarily retaining a program from the flash memory 38.

The output bus 58 is also a 16-bit bus so that the image data read out of the VRAM 56 is supplied to a second signal processing circuit 60. The second signal processing circuit 60 includes, for example, a color separating circuit and a matrix circuit, both not shown, so as to convert the image data read out of the VRAM 56 into luminance data and chrominance data. The luminance data and the chrominance data outputted from the second signal processing circuit 60 are converted into an analog luminance signal and chrominance signal by a D/A converter 62. The luminance signal and the chrominance signal from the D/A converter 62 are supplied to the LCD 64 provide on the digital still camera 10 or to a TV monitor (not shown) through an output terminal 66.

In order to reproduce sounds, the digital still camera 10 further includes a D/A converter 68. This D/A converter 68 converts the sound data loaded on a sound register 30 into an analog sound signal. This sound signal is supplied to an earphone 70, a speaker (not shown) or a sound output terminal 71.

Where the image data and the sound data obtained by the digital still camera 10 is given to a computer, the image data and the sound data are outputted through an output terminal 72 connected to the CPU 28. Meanwhile, where storing, into the flash memory 38, text data such as a telephone number list that is different from image data or sound data, the text data is supplied through an input terminal 74 to the CPU 28 so that the CPU 28 can write it into a text data area in the flash memory 38.

In the digital still camera 10 shown in FIG. 1, if the camera mode is set by the reproduce/camera mode selecting button 42, the selector 24 selects its first input 24a. At this time, if the monitor on/off button 46 is operated as required, the LCD 64 can be utilized as a viewfinder.

In this state, while the shutter button 40 is not depressed, the image data obtainable by converting the progressive scan signal from the CCD imager 14 into digital data by the A/D converter 18 is supplied to the first input 24a of the selector 24 via the first signal processing circuit 20 and the bus 22. Since the selector 24 in a camera mode is selected of its first input 24a as explained hereinbefore, the image data from the first signal processing circuit 20 is supplied for example in a DMA (direct memory access) to the VRAM 56 via the input bus 54. The image data supplied to the VRAM 56 is outputted onto an output bus 58, hence displaying an image on the LCD 64. Before depression of the shutter button 40, the VRAM 56 is renewed by the output of the CCD imager 14, i. e. the first signal processing circuit 20 so that the LCD 64 serves as a viewfinder.

When the shutter button 40 is depressed, a shutter signal is outputted from the system controller 52 and supplied to the interrupt terminal 28a of the CPU 28. Accordingly, the CPU 28 freezes the CCD imager 14. Therefore, the VRAM 56 is finally written by the image data due to the depression of the shutter button 40. The CPU 28 reads out the image data written in the VRAM 56, and carries out a well-known signal process such as JPEG to compress the image data. The compressed image data is stored in the flash memory 38.

Figure 4:
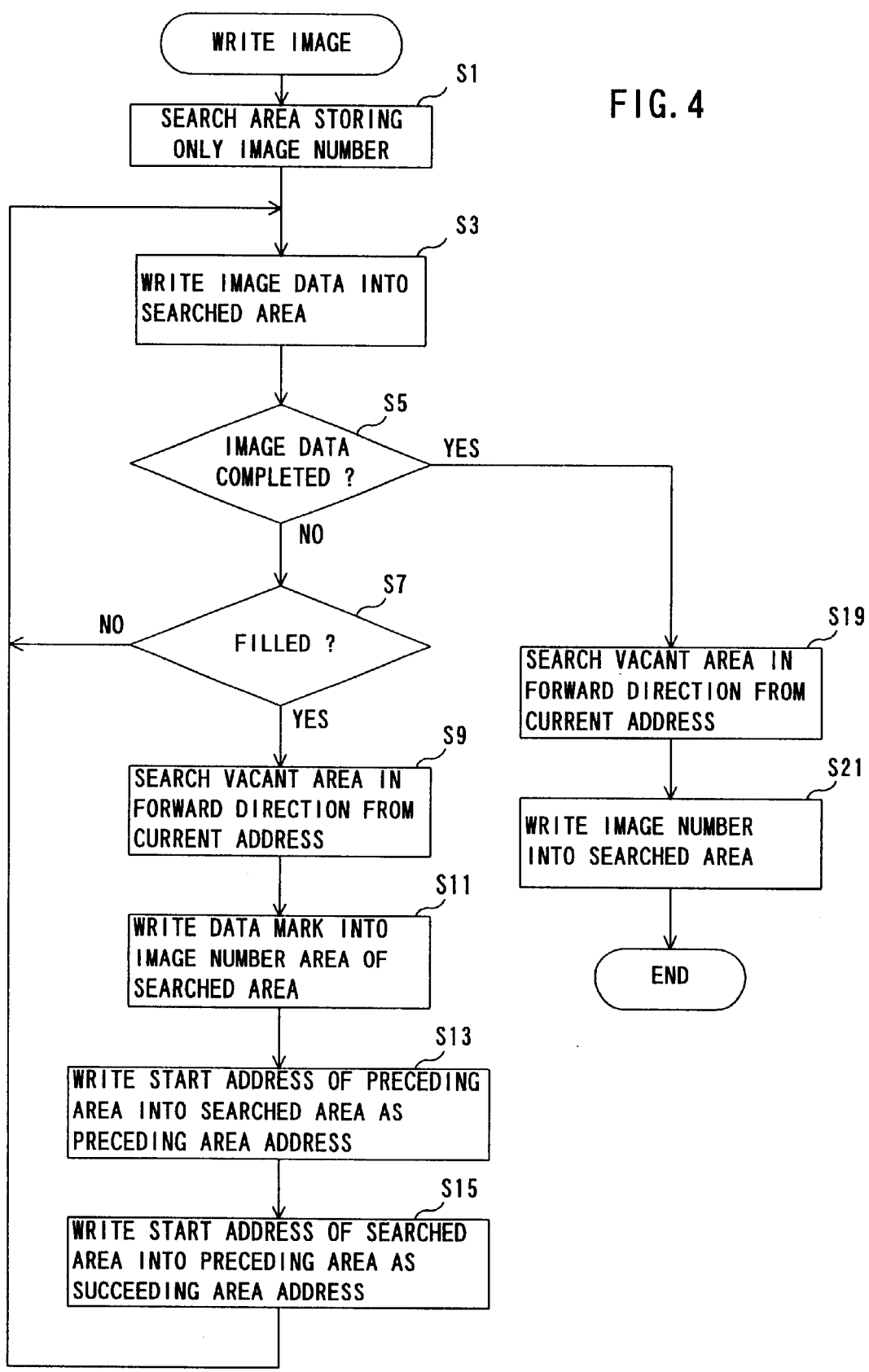
FIG. 4 is a flowchart showing an operation in a camera mode in the FIG. 1 embodiment.

When image data ①–⑥ are written in a state that nothing is written on the image data area of the flash memory 38 as shown in are A of FIG. 2, or when image data ⑦–⑨ are written in a state that the image data ② and ④ have been erased as shown in area B of FIG. 2, the CPU 28 performs processing on a flowchart shown in FIG. 4. That is, the CPU 28 searches, at a first step S1, a memory area written with only an image number, and writes the image data into the area at a step S3. The CPU 28 then determines, at a step S5, whether the image data writing is ended or not.

Figure 3:
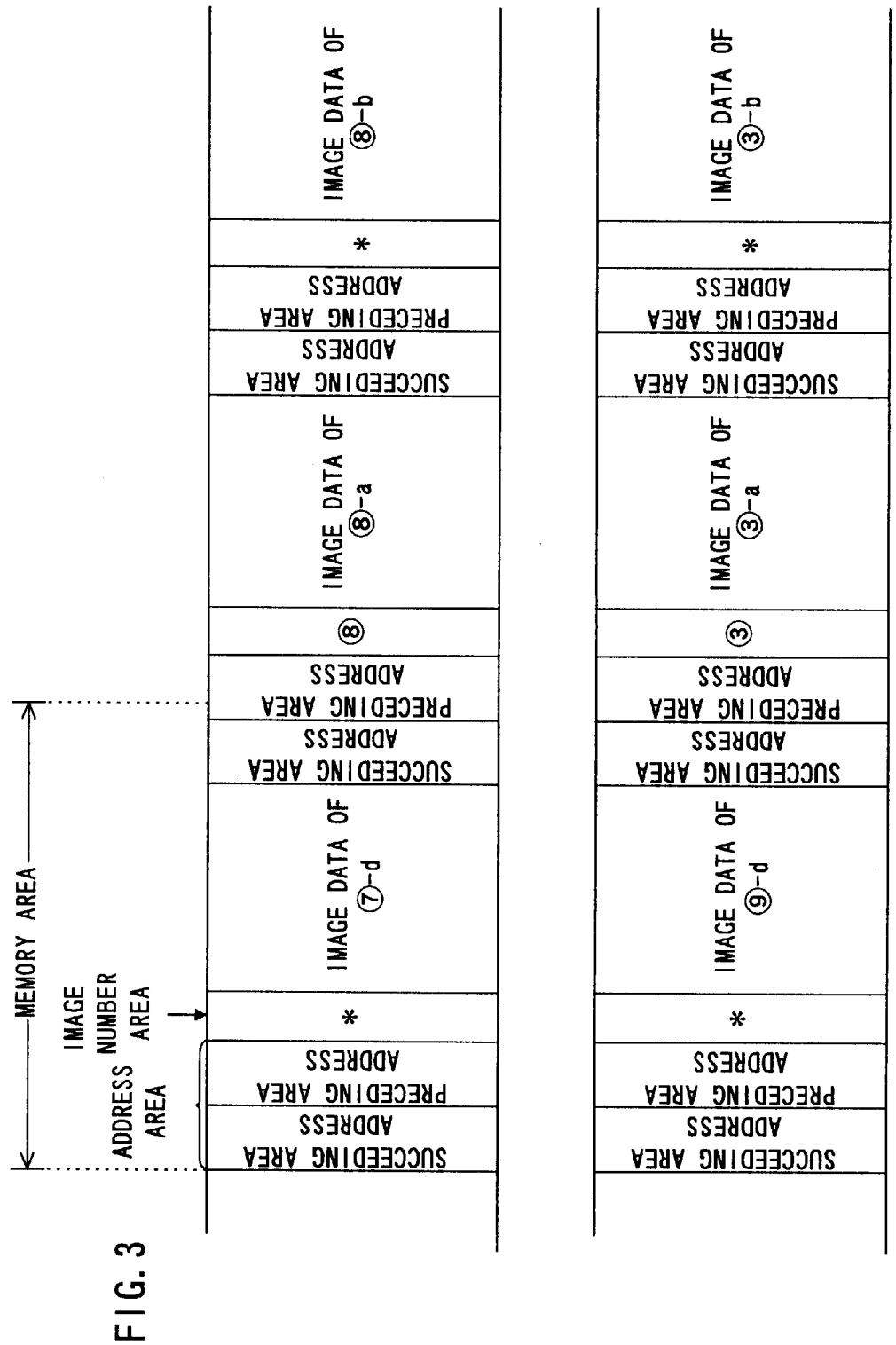
FIG. 3 is an illustrative view showing part of the flash memory.

If "YES", the CPU 28 searches at a step S19 a vacant memory area existing in a forward direction of the current address, and writes a succeeding image number onto a found vacant memory area at a step S21. The image number searched at the step S1 is one that has been written at this step S21 upon writing the preceding image data. For example, when ending the writing of partial image data into an area ⑦-d shown in FIG. 3, an image number "8" is written to an image number area of a succeeding vacant small area. This image number "8" is searched at the step S1 when a succeeding image data ⑧ is written.

If it is determined at the step S5 that the writing of the image data is not completed, the CPU 28 determines at a step S7 whether or not the current small area is filed up. If "NO", the CPU 28 returns the process to the step S3, while if "YES", the CPU 28 searches at a step S9 a vacant small area in the forward direction of the current address, and writes a data mark to an image number area of a found vacant small area. Here, the data mark refers to a mark representing that the image data has been written on a small area. The CPU 28 then writes, as a preceding area address, a head address of the small area (preceding small area) written with precedent partial image data into an address area of this small area, and then moves a pointer to write, as a succeeding area address, the head address of the small area found at the step S11 to an address area of the preceding small area at a step S15. Thereafter, the CPU 28 returns the pointer to a former position, and the process returns to the step S3 to write partial image data to the small area.

The CPU 28 makes processing in this manner. Accordingly, during writing the image data ⑧, the image number "8" is first detected and a memory area of which is written by partial image data ⑧-a. Then, writing is made for the head address of the preceding small area, i. e. the small area written with partial image data ⑦-d. The head address of the small area with the partial image data ⑧-a is written as a succeeding area address to the small area of the partial image data ⑦-d. Since the image data ⑧ is configured by partial image data ⑧-a and area ⑧-b, a vacant small area is subsequently searched. The found vacant small area is written by a data mark "*", the preceding area address and the succeeding area address.

Since the CPU 28 fills, successively, partial image data into searched vacant small areas, the service efficiency of the flash memory 38 can be enhanced. Further, since linkage is given between the partial image data, there is no necessity of managing or controlling the partial image data allocated to the memory areas with using a table or the like, extending the life of the flash memory 38. Further, each time the writing of image data is completed, a small area is searched so as to write a succeeding image number therein. Accordingly, even if newest image data should be erased away, the writing of image data is started from the small area written by the image number thereof. That is, the write-start position for image data is cycled within the image data area so that writing and erasing are made evenly throughout the image data area. Therefore, the life of the flash memory 38 can be extended in this respect.

After depressing the shutter button 40, if the sound memo button 48 is operated to input a sound through the microphone 32, the sound inputted is converted into sound data by the A/D converter 34 and loaded onto the sound register 30. The sound register 30 has the capacity of 5 bytes, as stated before. When this sound register 30 is filled up, a sound interruption is delivered from the sound register 30 to the interrupt terminal 28a of the CPU 28. That is, sound interruptions are given to the CPU 28 every 5 bytes (i.e.

10H). The CPU 28 compresses the inputted sound data according to a predetermined signal process, e.g. 8 bits into 4 bits, and writes it to a sound area of VRAM 56.

While the CPU 28 is writing the image data to the flash memory 38, the CPU 28 cannot write sound data to the flash memory 38. The sound data compressed according to the sound interruption by the CPU 28 is temporarily written into an appropriate area of the VRAM 56. That is, the writing of the compressed sound data to the VRAM 56 is carried out in parallel with the writing of the compressed image data to the flash memory 38.

Determination is then made as to whether the CPU 28 has processed a predetermined time period, e. g. 6 seconds, of sound data or not. As stated before, the sound interruption is inputted on every 10H, and 5 bytes of sound data is processed on each time. The processing of 6 seconds of sound data requires the reception of 9450 times (=525×6÷10×30) of sound interruptions. Therefore, the CPU 28 has a sound interrupting counter (not shown) so that, if the sound interrupting counter counts 9450 times of sound interruptions, the CPU 28 confirms that the processing of the sound data is ended. Incidentally, this "9450" has been calculated on the assumption that the number of horizontal scanning lines is 525 and one frame is at 1/30 second.

When the CPU 28 detects an end of the sound interruption, the CPU 28 writes the 6-second sound data accumulated in the VRAM 56 into the flash memory 38. At this time, by writing a head address, on which the sound data is to be written to the area beforehand, written by the image data, the CPU 28 can determine later whether a sound memo related to an image is recorded or not.

In this manner, in the camera mode the flash memory 38 is written by the respective compressed image data and sound data related thereto.

When a reproducing mode is selected by the reproduce/camera mode selecting button 42, the selector 24 selects its second input 24a due to a reproducing mode signal. In the reproducing mode, the CPU 28 reads image data out of the flash memory 38 to write this image data to a predetermined area of the VRAM 56 through the selector 24. Then the CPU 28 expands the image data temporarily written in the VRAM 56 according to the predetermined signal process, e. g. JPEG. The expanded image data is written into the VRAM 56 through the selector 24. Therefore, image data is outputted from the VRAM 56 through the second signal processing circuit 60 and the D/A converter 62 to the LCD 64 so that a reproduced image is displayed thereon.

In the reproducing mode, the sound data read out of the flash memory 38 is expanded by the CPU 28 similarly to the image data, and outputted through the interrupt terminal 28a of the CPU 28 to the sound register 30. Therefore, the sound memo written in the flash memory 38 is reproduced through the earphone 70.

Figure 5:
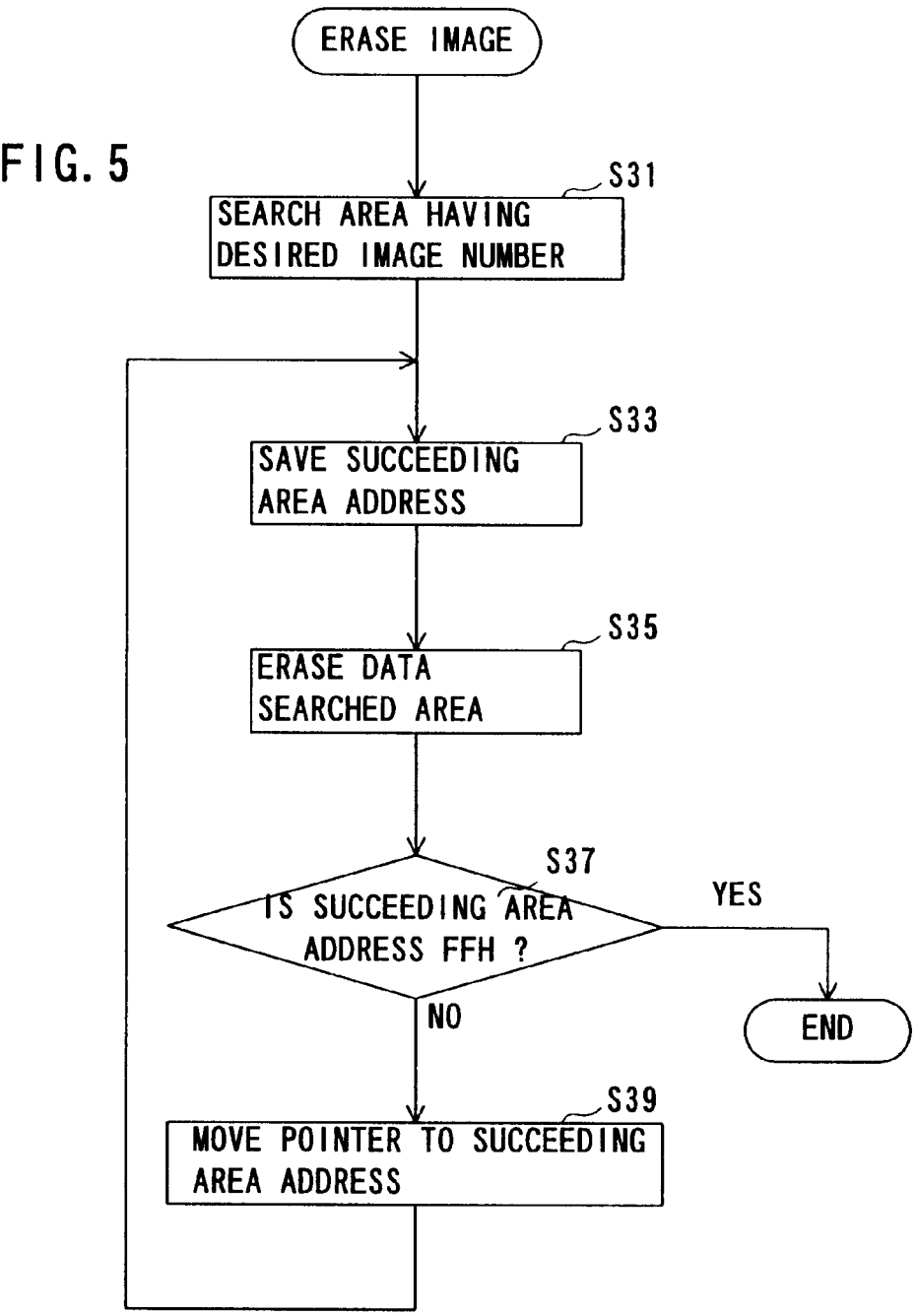
FIG. 5 is a flowchart showing an operation in an erasing mode in the FIG. 1 embodiment.

In the reproducing mode, if the shutter button 40 or the erase button 50 is operated in a state that a reproduced image is displayed on the LCD 64, the CPU 28 responds to the operation and makes a process of a flowchart shown in FIG. 5, erasing the image data for the same image from the flash memory 38. That is, a small area having a desired image number is searched at a step S31, and a succeeding area address data to a small area is retreated to an internal memory 28b of the CPU 28 at a step S33. At a step S35 erasure is made for all the data on the searched small area, i. e. the succeeding area address data, the preceding area address data, the image data (data mark) and the partial image data. The CPU 28 then reads out the retreated succeeding area address data at a step S37, and determines whether the address thereof is "FFH" or not. If "YES", the erased partial image data is determined as a last partial image data and the process is ended. If "NO", the pointer is moved to the succeeding area address at a step S39 and the process returns to the step S33.

Accordingly, while the image data ①–⑥ are recorded in the flash memory 38 as shown in area A of FIG. 2, if the image data ②, ④, for example, are erased, vacant small areas are left in the flash memory 38 as shown in area B of FIG. 2. Since the partial image data is erased by moving the pointer according to the succeeding area address, image data can be desirably erased even if partial image data are written at distant memory areas.

Figure 6:
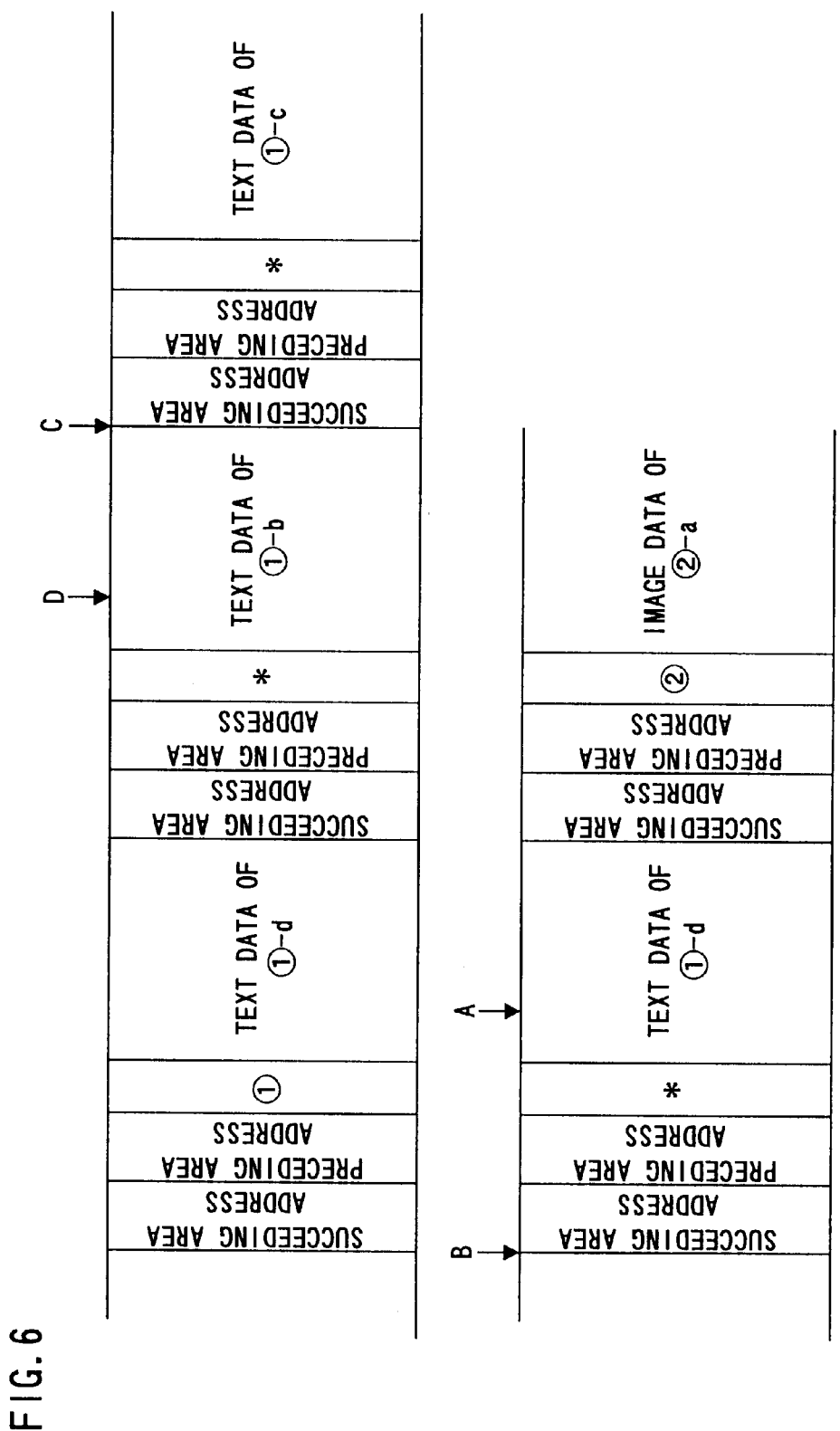
FIG. 6 is an illustrative view showing part of the flash memory.
Figure 7:
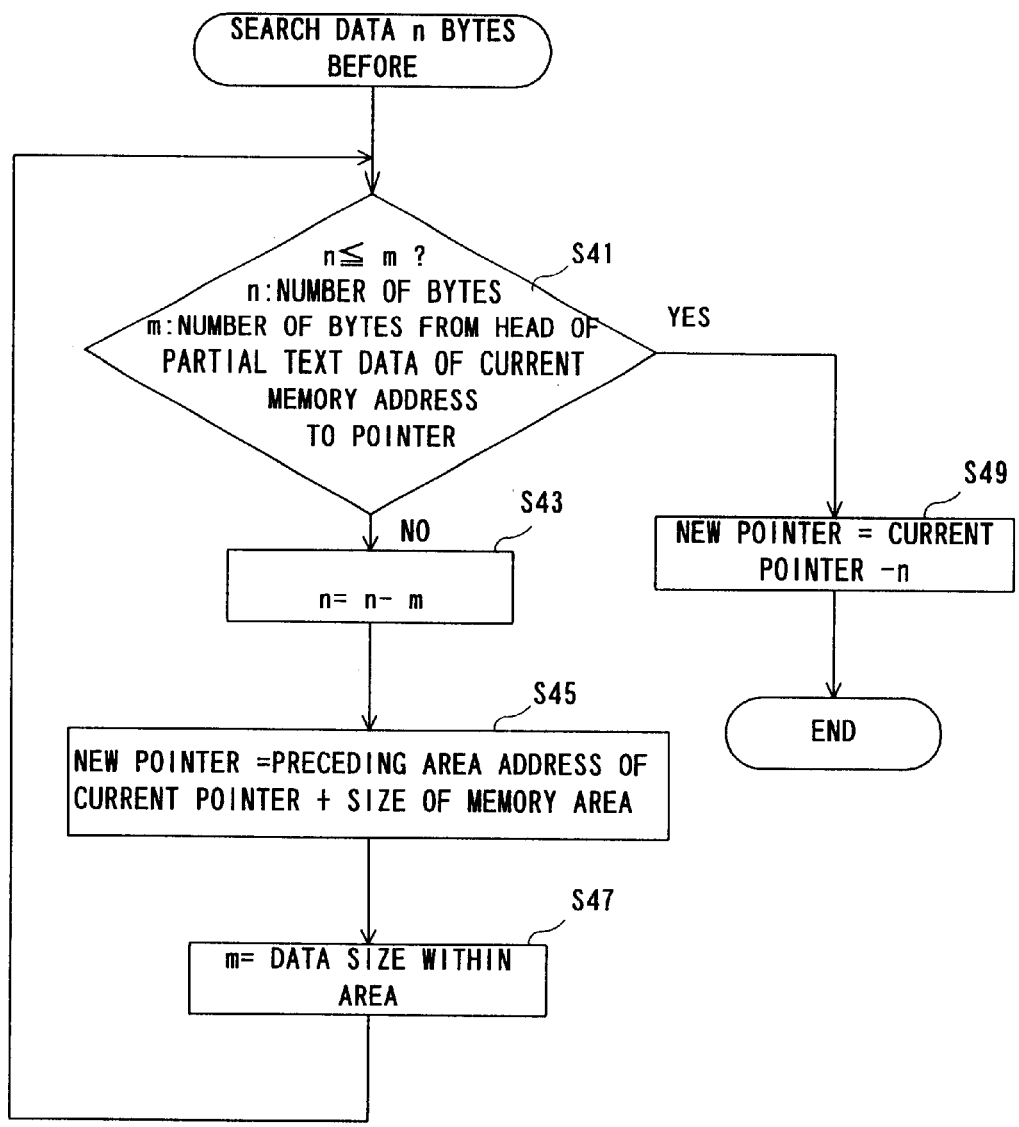
FIG. 7 is a flowchart showing an operation in a search mode in the FIG. 1 embodiment.
Figure 8:
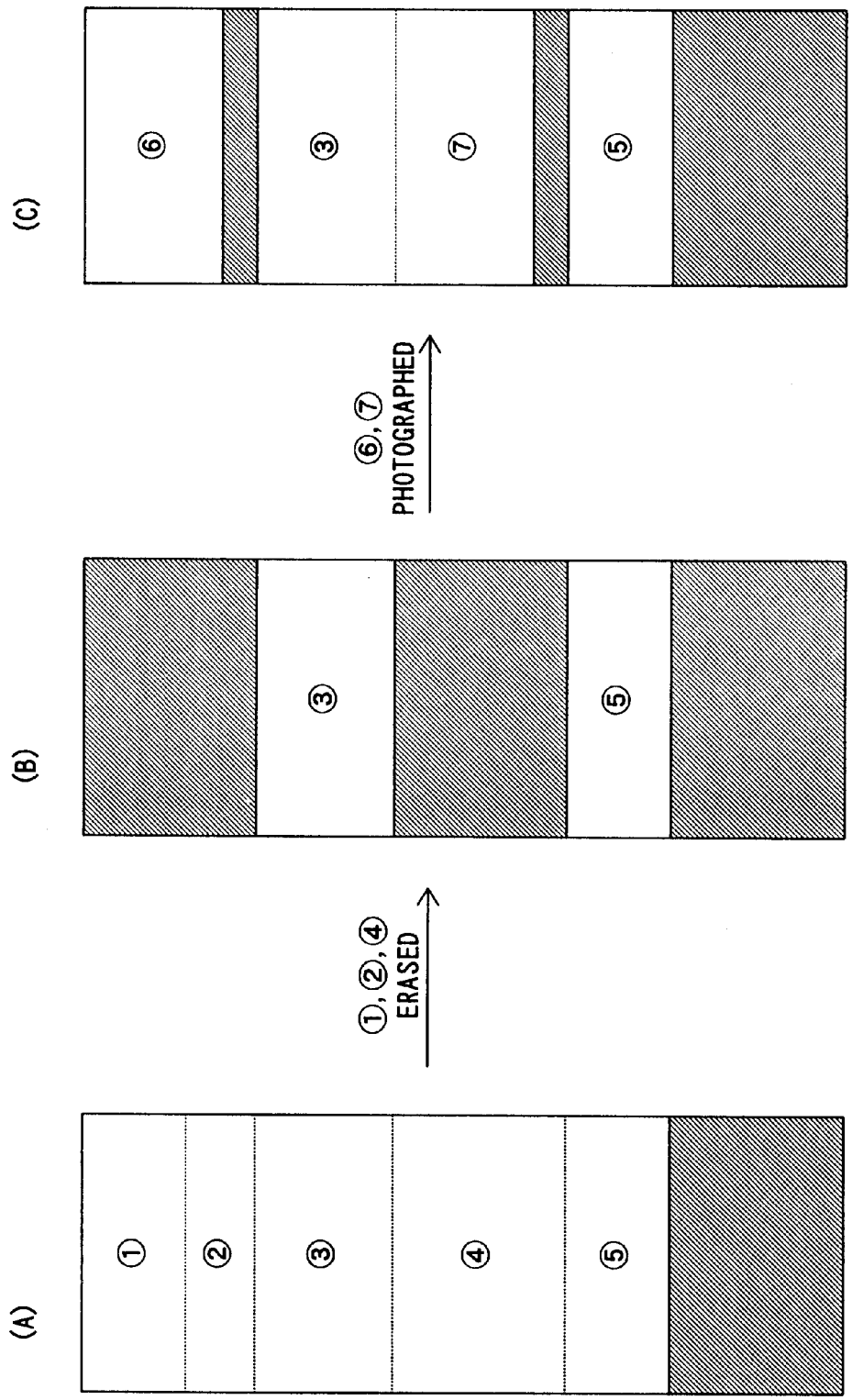
FIG. 8 is an illustrative view showing an operation of a prior art.
Figure 9:
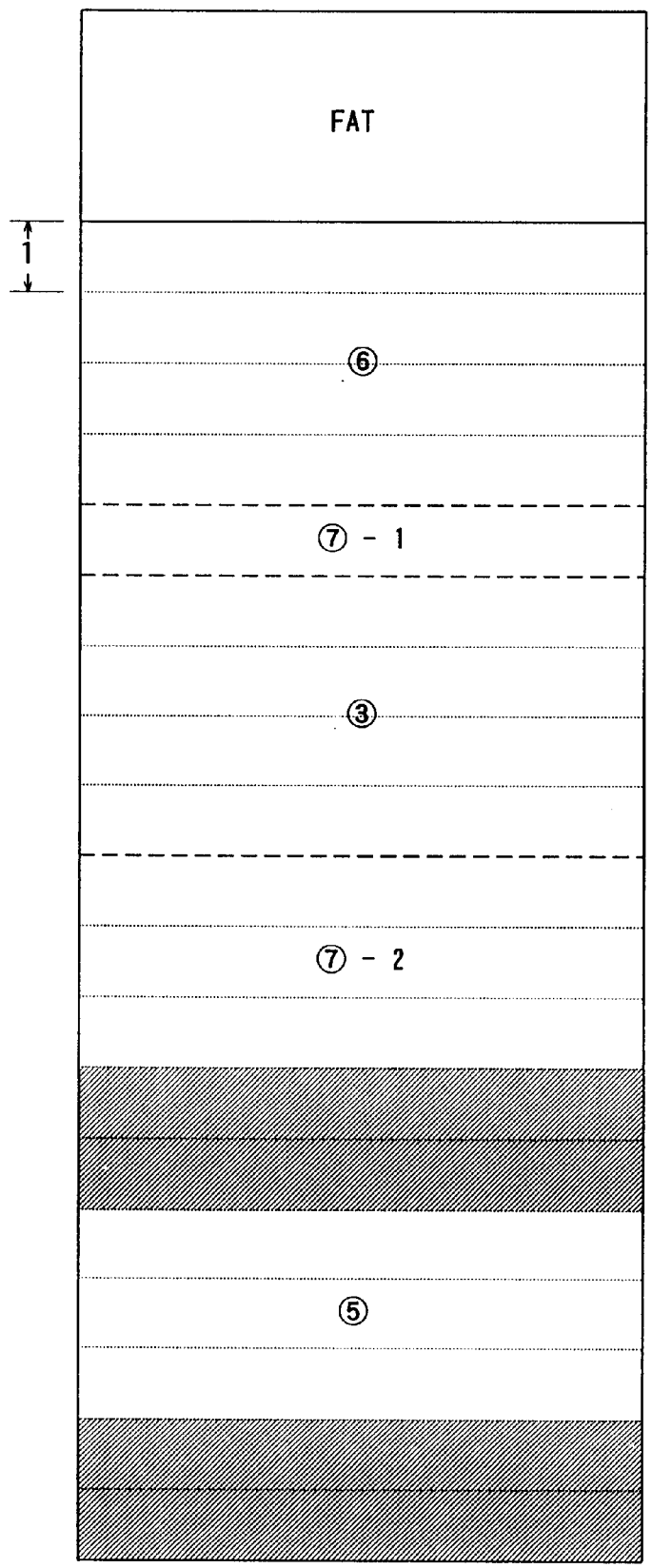
FIG. 9 is an illustrative view showing another prior art.

Text data is written in the same manner as the image data by the CPU 28. The text data is concretely configured, for example, as shown in FIG. 6. If a moving button 49 is operated with the pointer now positioned at a position A, the CPU 28 makes a process of a flowchart shown in FIG. 7, to move the pointer to a position D in FIG. 6. The CPU 28 determines at a step S41 whether or not the number of bytes n is equal to or smaller than the number of bytes m of from a head of the partial text data at the current small area to the pointer. Provided, in FIG. 6, that the number of bytes of the text data from a position A to a position D is 1000 bytes, the number of bytes n is "1000" and the number of bytes m is the number of bytes of from a head of the partial text data ①-d to the position A. Since the CPU 28 at this time determines "NO", the CPU 28 renews the number of bytes from n to n−m at a step S43, and moves the pointer at a step S45 to a position (position B) that is added by a small area size to the preceding area address written at the current small area. Provided that the number of bytes m is "40", the number of bytes n is renewed to "960" (=1000−40) at the step S43, and the pointer is moved to a last address of the memory area written with the partial text data ①-c. The CPU 28 renews at a step S47 the number of bytes n to a size of the partial text data contained in the current small area, and the process returns to the step S41. Provided that the number of bytes of the partial text data written in each of the small areas is "512", the number of bytes m is renewed at the step S47 to "512".

When the pointer is moved to a position C according to the preceding area address in this manner, at the step S41 the number of bytes (the number of bytes n) from the position D to a last address of the small area of the partial text data ①-b becomes smaller than the number of bytes (the number of bytes m) from a head of the small area of the partial text data ①-b to the pointer. Accordingly, "YES" is determined at the step S41, and the CPU 28 subtracts the number of bytes n from the current pointer position C to move the pointer to a position (position D), ending the process.

In this manner, the pointer can be moved to a desired position through the preceding area address by writing the preceding area address data each time text data is written. It is natural that the process like this is also applicable to image data.

Incidentally, although in the above embodiment part of the VRAM 56 was utilized as a working memory for the CPU 28, another working memory may be provided. Also, explanations were on the embodiment that the electronic image recording apparatus is a digital still camera. However, this invention is applicable to an arbitrary electronic image recording apparatus that has a recording medium for recording an image and a sound related thereto.

Further, other nonvolatile RAMs than the flash memory may be applied for the memory medium.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data memorizing method of an electronic image recording apparatus for storing one frame of image data into a memory throughout which a plurality of vacant memory areas are formed such that the areas are spread throughout the memory, the method comprising the steps of:

(a) writing first partial image data included in said one frame of image data into one vacant memory area out of said plurality of vacant memory areas;

(b) writing second partial image data included in said one frame of image data and associated with said first partial image data into another vacant memory area out of said plurality of vacant memory areas; and (c) writing starting address information of one memory area out of a first memory area and a second memory area into the other memory area out of said first memory area and said second memory area, wherein said first memory area is an area to which said first partial image data is written, and said second memory area is an area to which said second partial image data is written.

2. The method according to claim 1 further comprising the step of: (d) writing starting address information of said other memory area into said one memory area.

3. The method according to claim 1 further comprising the steps of:

(e) searching the vacant memory area when the writing of all the partial image data forming said one frame of image data is complete; and (f) writing an identification number of succeeding one frame of image data into the vacant memory area found in the step (e).

4. The method of claim 3 further comprising the step of: (g) searching the vacant memory area storing the identification number before said step (a) is performed.

5. The method of claim 1 wherein the step (b) includes the step of: (b1) writing a data mark indicating a presence of said second partial image data into said another vacant memory area.

6. An electronic image recording apparatus for recording one frame of image data into a memory throughout which a plurality of vacant memory areas are formed such that the areas are spread throughout the memory, comprising:

an image data writer for respectively writing first partial image data and second partial image data included in said one frame of image data and associated with each other into two vacant memory areas out of said plurality of vacant memory areas; and a first address information writer for writing address information of a first memory area into a second memory area, wherein said first memory area is an area to which said first partial image data is written, and said second memory area is an area to which said second partial image data is written.

7. The apparatus according to claim 6 further comprising a second address information writer for writing address information of said second memory area into said first memory area.

8. The apparatus according to claim 6 wherein said second partial image data is data preceding said first partial image data.

9. The apparatus according to claim 6 further comprising an identification information writer for writing identification information of said one frame of image data into the vacant memory area at a starting location at which partial image data is to be stored.

10. The apparatus according to claim 6 wherein each of said vacant memory areas has a capacity equal to a minimum erasing unit of the memory.

11. A digital camera for recording one frame of image data into a memory throughout which a plurality of vacant memory areas are formed such that the memory areas are spread throughout the memory, comprising:

an image data writer for respectively writing first partial image data and second partial image data included in said one frame of image data and associated with each other into two vacant memory areas out of said plurality of vacant memory areas; and a first address information writer for writing address information of a first memory area into a second memory area, wherein said first memory area is an area to which said first partial image data is written, and said second memory area is an area to which said second partial image data is written.

* * * * *